C. R. LORD.
HILL CLIMBING AND ANTISKIDDING DEVICE FOR AUTOMOBILES.
APPLICATION FILED FEB. 15, 1918.

1,274,568.

Patented Aug. 6, 1918.
2 SHEETS—SHEET 1.

INVENTOR
Chester R. Lord,
J. W. Bond
ATTORNEY

C. R. LORD.
HILL CLIMBING AND ANTISKIDDING DEVICE FOR AUTOMOBILES.
APPLICATION FILED FEB. 15, 1918.
1,274,568.
Patented Aug. 6, 1918.
2 SHEETS—SHEET 2.
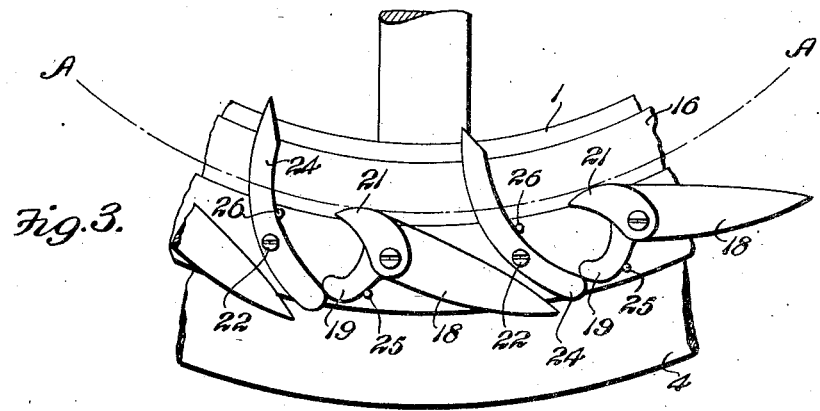
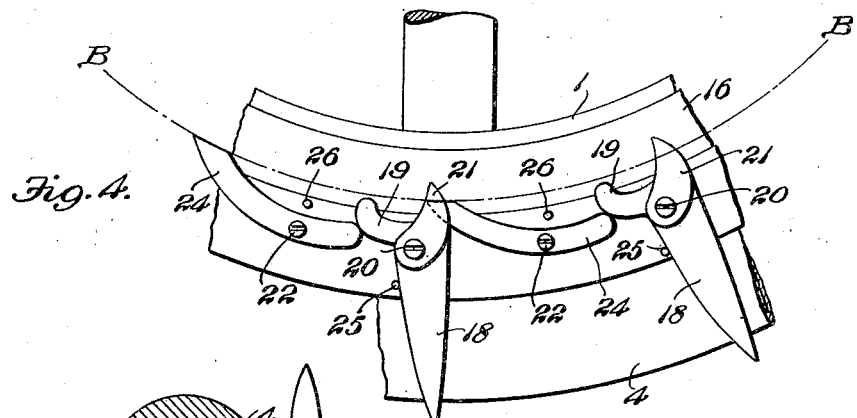
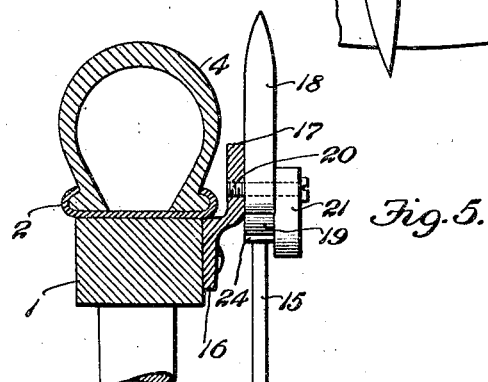
INVENTOR
Chester R. Lord,
J. W. Bond
ATTORNEY

UNITED STATES PATENT OFFICE.

CHESTER R. LORD, OF MINERAL CITY, OHIO.

HILL-CLIMBING AND ANTISKIDDING DEVICE FOR AUTOMOBILES.

1,274,568.      Specification of Letters Patent.      Patented Aug. 6, 1918.

Application filed February 15, 1918. Serial No. 217,433.

*To all whom it may concern:*

Be it known that I, CHESTER R. LORD, a citizen of the United States, residing at Mineral City, in the county of Tuscarawas and State of Ohio, have invented a new and useful Hill-Climbing and Antiskidding Device for Automobiles, of which the following is a specification.

This invention relates to hill climbing and anti-skidding device for automobiles and has for its object to provide a device of this character that is permanently connected to said automobile wheels and can be thrown into and out of operation at the will of the driver of a car by simply operating a lever adjacent the driver's seat.

Another object is to construct an attachment for the rear wheels of automobiles which can be instantly operated by the driver of the automobile to bring the road engaging points into extended position to increase traction in driving the car on steep grades.

Another object is to provide such a device which eliminates the hard usage and extraordinary wear which the rear tires of an automobile receive when equipped with chains or similar well known devices.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the drawings:

Fig. 3 is a side elevation looking from the inside of a bottom fragment of a rear wheel of an automobile showing a number of the lever pawls and road-engaging points in the position which they would assume when the operating lever is moved in position to keep the said points out of engagement with the road.

Fig. 4 is a similar view showing the lever pawls and road-engaging points moved into position to engage the roadway.

Fig. 5 is a cross sectional view through a portion of the wheel with my device applied thereto and showing the sliding arm for actuating the lever pawls and road-engaging points and moved to swing said engaging points into operative position.

Figure 1:
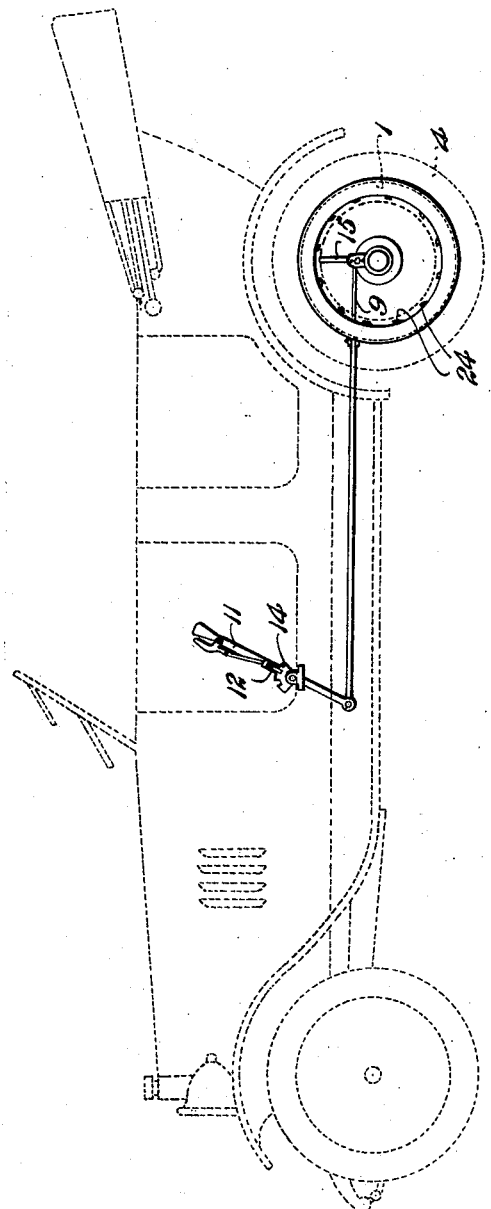
Figure 1 is a side elevation of an automobile shown in dotted lines with my hill climbing and anti-skidding device shown thereon in full lines in the position which it will assume applied to an automobile.

Similar numerals of reference indicate corresponding parts throughout the several figures of the drawings.

1 indicates an automobile wheel of ordinary construction, such as is used upon the rear of automobiles, carrying the usual tire rim 2 and tire 4, and 5 indicates the rear axle of an automobile or more specifically the axle housing. Mounted upon the said housing in any suitable manner and equally spaced at either side of the differential casing are lugs 6 which are designed to form guides for sliding rods 7, the opposite or outside ends of each of said rods being mounted to slide within U-shaped members 8 clearly shown in Fig. 5. Pivotally connected to each of the rods 7 is a rod 9 which extends diagonally forward and toward the longitudinal center line of the car where the ends of the said rods 9 are pivotally connected to a forwardly extending rod 10.

Mounted in the forward or driver's compartment of the automobile is a pivoted lever 11 which carries a spring pressed pawl 12 designed to engage the notches in a notched segment 14, the lower end of the rod 11 extending beneath its pivotal point being pivotally connected to the forward end of the rod 10. The whole arrangement of the rods 9 and 10 is designed to form a toggle which through the connection with the rods 7 will cause the said rods 7 to move longitudinally with respect to the rear axle when the lever 11 is moved from front to rear position or vice-versa. Secured to the outside ends of each of the sliding rods 7 is an up-standing arm 15 slidably mounted upon horizontal pins secured within the U-shaped members 8 which thus keep the arms 15 in upright position as shown in Fig. 5.

Figure 2:
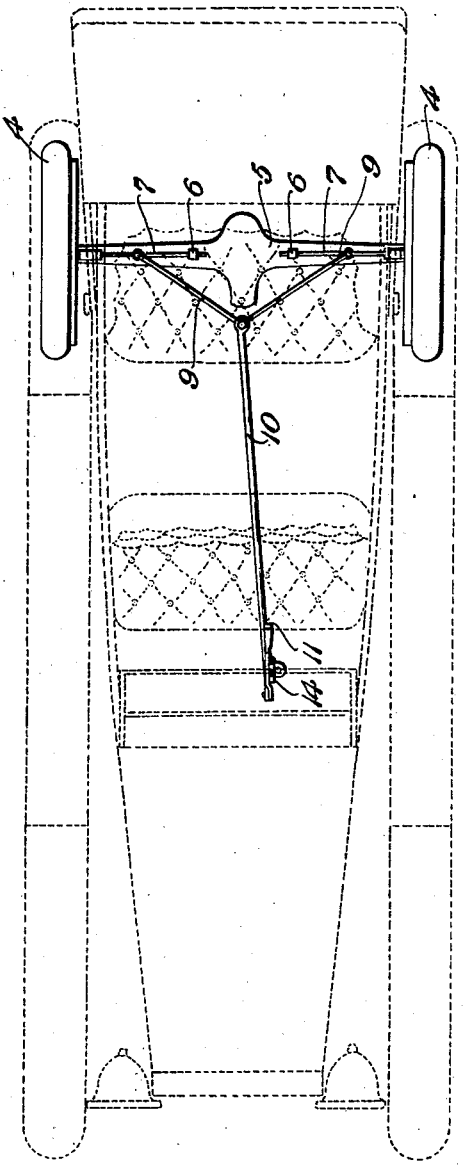
Fig. 2 is a plan view of an automobile shown in dotted lines with my device attached thereto shown in full lines and disclosing the toggle arrangement for operating the same.

Referring now to Figs. 3, 4 and 5, an annular ring 16 is secured by screws, bolts or other suitable means to the inner side of the felly of each of the rear wheels and projecting outwardly and spaced from the tire and rim of the wheel is a flange portion 17 integral with the ring 16, and as shown a plurality of road-engaging points 18 having laterally projecting tail portions 19 are pivoted upon pins 20 secured in equidistantly spaced threaded apertures in the flange portion 17. Formed integral with the road-engaging points 18 and upon the side thereof opposite the flange 17 is a pointed tooth 21. A second series of pins 22 threaded into apertures in the flange 17 carry pivoted lever pawls 24, which are rounded at one end and engage the tail portions 19 and have a substantially flattened face at their other ends. In Figs. 2 and 3 and dot and dash lines A—A and B—B, respectively, indicate the arc described by the end of the arm 15 as the wheel rotates about said arm. Stop pins 25 secured in the flange 17 adjacent the members 18 and similar pins 26 adjacent the members 24 are for a purpose to be hereinafter set forth. By reference to Fig. 5 it will be seen that the pawls 24 are arranged to lie in the same plane as the members 18 and that the teeth 21 occupy a plane nearer the longitudinal center line of the automobile than the pawls 24 and the members 18.

Especial attention is now called to Fig. 5 in which the arm 15 is moved to the limit of its outward movement, that is, to the plane to engage with its upper end the pawl levers 24. This positioning of the arm 15 will be done by releasing the pawl 12 upon the lever 11 from the rear notch in the segment 14 Fig. 1, and moving the said lever forwardly until the pawl 12 engages the forward notch upon the segment. This will cause the rod 10 to be moved rearwardly and to force the arm 9 to spread thus thrusting the sliding rods 7 outwardly. In this position the arm 15 will contact with the lever pawls 24 and swing them upon their pivot pins 22 into the position shown in Fig. 4, in which position the arm 15 will ride over the flattened faces upon the lever pawls leaving them in the position shown. It will be obvious that the engagement of the rounded ends of the lever pawls with the tail portions 19 of the road-engaging points 18 will cause the said road-engaging points to swing upon the pivot pins 20 and to assume the position shown in Fig. 4. In this position the pointed ends of the fingers project slightly behind the periphery of the tire and will thus engage the roadway as the wheel rotates. The pins 25 form stops to prevent further movement of the road-engaging points than that given them by the lever pawls 24 and since the pawls 24 will be held in this position by contact, at each revolution, with the arm 15, the engaging points will remain extended until the lever 11 is moved back into the position shown in Fig. 1.

When the operator desires to withdraw the engaging points 18 he brings the lever 11 to its rearward position which causes the rods 7 through the toggle to be withdrawn positioning the arm 15 in a plane to engage the teeth 21.

Attention is now called to Fig. 3 which shows the pawls 24 and the road-engaging points 18 moved into the position which they assume when the teeth 21 engage the end of the arm 15. It will be seen that the pawls are now in engagement with the stop-pins 26 thus preventing any further movement than that given them by the tail portions 19 and since the teeth 21 engage at each revolution the end of the arm 15, the parts will remain so positioned until the lever is again moved.

From the foregoing description it will be obvious that the operator of a vehicle equipped with my device can instantly bring the road engaging points into extended position when he feels the car begin to skid. Also upon approaching a steep grade when the roadway is slippery with water or ice the lever can be thrown to extend the road engaging points to assist the rear wheels in forcing the car up the hill.

Having fully described my invention what I claim as new and desire to secure by Letters Patent, is—

1. In a device of the character described comprising a ring secured to each of the rear wheels of an automobile and concentric therewith, a plurality of road engaging points pivoted upon said ring, a plurality of pivoted lever pawls upon said ring and equal in number to said road engaging points and means adjacent the operator's seat of said automobile for rocking the said lever pawls upon their pivots to swing the road engaging points in position to engage the roadway.

2. In a device of the character described, a ring concentrically secured to each of the rear wheels of an automobile, a plurality of road engaging points pivoted upon said ring, a plurality of lever pawls pivoted upon said ring and equal in number to said road engaging points, a movable arm adjacent each of the said rear wheels and means for sliding said movable arm into alinement with said lever pawls to rock them upon their pivots to bring the said road engaging points into position to engage the roadway.

3. In an anti-skid attachment for the rear wheels of automobiles, a ring carried by each of said wheels, a plurality of road engaging points pivoted upon each of said rings, a plurality of lever pawls equal in number to said road engaging points and pivoted upon each of said rings, said movable arms being slidably mounted upon the rear axle of the automobile and means for moving said movable arms into and out of alinement with said lever pawls.

4. In a device of the character described, a ring secured to each of the rear wheels of an automobile, a plurality of road engaging points pivoted upon each of said rings, a plurality of lever pawls pivoted to each of said rings and equal in number to the said road engaging points and adapted to rock said road engaging points upon their pivots to bring them into position to engage the roadway, an off-set tooth upon each of said road engaging points, each of said off-set teeth being disposed in a horizontal plane out of alinement with said road engaging points and lever pawls, a movable arm slidably mounted adjacent each of said wheels and means for moving said movable arm into alinement with said lever pawls and to engage said lever pawls as the wheels rotate and to cause said lever pawls to swing upon their pivots and to rock the road engaging points into position to engage the roadway and means for moving said movable arms out of alinement with said lever pawls and into alinement with the teeth upon said road engaging points and to engage said teeth to swing the road engaging points out of position to engage the roadway.

In testimony that I claim the above, I have hereunto subscribed my name.

CHESTER R. LORD.